US008636587B2

(12) United States Patent
Manfredi et al.

(10) Patent No.: US 8,636,587 B2
(45) Date of Patent: Jan. 28, 2014

(54) METHOD AND APPARATUS FOR AWARDING A MYSTERY PROMOTIONAL TICKET

(75) Inventors: Vincent Salvatore Manfredi, Henderson, NV (US); Jay Martin Roper, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/542,466

(22) Filed: Jul. 5, 2012

(65) Prior Publication Data

US 2012/0270642 A1 Oct. 25, 2012

Related U.S. Application Data

(62) Division of application No. 11/155,445, filed on Jun. 17, 2005, now Pat. No. 8,241,111.

(60) Provisional application No. 60/581,010, filed on Jun. 17, 2004.

(51) Int. Cl.
*G06F 17/00* (2006.01)

(52) U.S. Cl.
USPC ................................ 463/25; 463/42; 705/14.1

(58) Field of Classification Search
USPC ........................... 463/25, 42; 705/14.1, 14.14
See application file for complete search history.

(56) References Cited

U.S. PATENT DOCUMENTS

| | | | | |
|---|---|---|---|---|
| 6,298,329 | B1 * | 10/2001 | Walker et al. | 705/14.26 |
| 6,371,852 | B1 * | 4/2002 | Acres | 463/25 |
| 6,431,983 | B2 * | 8/2002 | Acres | 463/25 |
| 6,536,663 | B1 * | 3/2003 | Lozier et al. | 235/379 |
| 6,866,586 | B2 * | 3/2005 | Oberberger et al. | 463/42 |
| 7,229,353 | B2 * | 6/2007 | Seelig | 463/25 |
| 2004/0053681 | A1 * | 3/2004 | Jordan et al. | 463/20 |
| 2006/0039733 | A1 * | 2/2006 | Meyerhofer | 400/62 |

* cited by examiner

*Primary Examiner* — Michael Cuff
(74) *Attorney, Agent, or Firm* — Griffiths & Seaton PLLC

(57) ABSTRACT

A gaming machine award system acts over a gaming machine network having a plurality of gaming devices coupled thereto. The award system includes a bonus server coupled to the network and having stored thereon a trigger condition. A game play tracker tracks game play across the network of gaming devices and detects an occurrence of the trigger condition. The bonus server sends out a selection signal over the network to a selected gaming machine responsive to the detected trigger condition. A printer associated with the selected gaming machine is structured to generate a mystery ticket printed output responsive to receipt of said selection signal including machine-readable indicia corresponding to a record of value stored at the bonus server, and human readable indicia that indicates only a range of possible values of the ticket but not a specific value. The printed ticket is a cashless instrument that may be redeemed or played per the nature and characteristics of the award given with the specific value awarded to the player.

20 Claims, 9 Drawing Sheets

FIG.9
FIG.10
CONGRATULATIONS!
You've just won between $5 & $100 in XtraCredit®
on your next visit.
INSERT THIS SIDE UP
RETURNPLAY
VALIDATION
00-6446-5941-0304-1359
11/14/02 10:26:17
TICKET # 0191
Thanks for playing at Acres Casino
See you soon.
Insert this ticket into any ticket in/ticket out game after midnight tonight to receive your reward.
INSERT THIS SIDE UP
CONGRATULATIONS!
CONGRATULATIONS!
You've just won between
$5 & $100
in XtraCredit® on your next visit.
INSERT THIS SIDE UP
RETURNPLAY
RETURNPLAY
INSERT THIS SIDE UP
Thanks for playing at Acres Casino
See you soon.
Insert this ticket into any ticket in/ticket out game after midnight tonight to receive your reward.

METHOD AND APPARATUS FOR AWARDING A MYSTERY PROMOTIONAL TICKET

CROSS-REFERENCES TO RELATED APPLICATIONS

This application is a Divisional Application of U.S. application Ser. No. 11/155,445, filed Jun. 17, 2005, which claims the benefit from U.S. Provisional Patent Application No. 60/581,010 filed Jun. 17, 2004, and which applications are incorporated herein by reference. A claim of priority to all, to the extent appropriate is made.

BACKGROUND OF THE INVENTION

1. Field of the Invention

This invention relates generally to networked gaming devices and more particularly to a method and apparatus for issuing and redeeming promotional items of indeterminate value.

2. Description of the Prior Art

Electronic gaming devices, such as slot machines and video poker games, have been combined into networks in casinos and other establishments where such games are located. One kind of prior art network implements functions such as player tracking, slot accounting, security, etc. More recently an additional function, namely awarding a bonus to a player of a gaming device, has been implemented on the same network that provides the player tracking, accounting, and other functions. An example of such a network can be seen in U.S. Pat. No. 5,752,882 for a Method and Apparatus for Operating Networked Gaming Devices, assigned to International Gaming Machine, which is incorporated herein by reference for all purposes.

A second type of prior art network is used to dispense an award ticket to a player of a gaming device via a printer located in the device. The player is therefore able to receive a cashless instrument, the ticket, which represents cash from the machine, whether as a result of a jackpot award or of cashing out the player's money from a credit meter on the device. This system is sometime known as an award ticket system or a ticket in/ticket out (TITO) system, the latter name referring to a feature in which a ticket from one device can be accepted via a bill/ticket reader at another machine. An example of this second type of network is the EZ Pay™ ticket system by International Game Technology of Reno, Nev. One example of such a system can be seen in U.S. Pat. No. 6,394,907 for a Cashless Transaction Clearinghouse, assigned to International Game Technology, which is incorporated herein by reference for all purposes.

However, since competition for players is intense in the gaming industry, the need exists for additional bonusing and notification features that create additional attraction and play opportunities for the players.

SUMMARY OF THE INVENTION

An award system implemented according to the present invention comprises a bonus server coupled over a network to a ticket printer and a ticket reader. The bonus server has stored thereon a trigger condition and an associated award scheme and is adapted to send over the network to the printer a print command responsive to detection of the trigger condition. The printer is adapted to issue a printed output responsive to the print command including a ticket identification code readable by the ticket printer. The printed output does not, however, include printed indicia reflecting a specific value of the printed output. Instead, the specific value is only associated with the ticket identification code at the bonus server and is awarded to a player upon ticket redemption at the ticket reader.

Triggering mechanisms could be adapted to generate numerous conditions that result in delivery of a bonus ticket to a player. An example of ways to create rules for triggering bonuses and to trigger bonuses in accordance with the rules can be found in U.S. patent application Ser. No. 10/663,379, filed on Sep. 15, 2003, for System Controlled Player-Related Bonuses in Gaming Machines, assigned to Acres Gaming, which is incorporated herein by reference for all purposes. The application also discloses a number of conditions that produce or trigger a bonus award, mechanisms for timing the bonus payment, and mechanisms for paying and notifying the player of the bonus award. Although some of the payment mechanisms in the chart may not necessarily be amenable to delivery via a printed ticket, it can be seen that these few examples, which are not exhaustive, can be combined in numerous ways to create a variety of player experiences that result in a bonus ticket.

The invention further comprises a method for redeeming printed indicia for specific value at gaming devices that are interconnected by a gaming network to a host computer. The method comprises storing a trigger condition at a host computer, and detecting an occurrence of the trigger condition and sending out a selection signal over the network to a printer location responsive to the detected trigger condition. Printed output is then generated at the printer location responsive to receipt of the selection signal, where the printed output is arranged to include machine-readable indicia and human-readable indicia. The machine-readable indicia is adapted to correspond to a ticket identification code, and the human-readable indicia is adapted to correspond to a range of possible values of said ticket with no specific value indicated. A specific value for the ticket is associated with the ticket identification code at the host computer so that when the machine-readable indicia is read at a ticket reader and transmitted over the network to the host computer, by way of accepting the printed output at a gaming machine, an operation awarding the specific value bonus associated with said printed output is enacted.

The invention further comprises methods for awarding bonuses associated with related events occurring at the casino where the gaming machines are located. In one such method, a subset of gaming machines are associated with the bonus. A bonus trigger condition is detected at one of the gaming machines during a pre-determined time period, for instance early night just before night-club hours of operation. The trigger condition is detected, for example when the player obtains a special symbol at the slot machine, and the bonus is awarded at the first location (e.g. slot machine) but redeemed at the second location (e.g. night club) where the second location is proximate the location of the gaming machine issuing the award.

In a second such bonus type, a bonus is issued via printed indicia from a retail location for use at gaming machines. A trigger condition (e.g. a purchase amount and/or location) is stored at a host computer. A selection signal is sent out over the network to a printer location responsive to the detected trigger condition. Printed output is generated at said printer location responsive to receipt of said selection signal including machine-readable indicia corresponding to a ticket identification code. The printed output is then accepted at a gaming machine whereupon the player is awarded a specific value bonus associated with the printed output.

The invention further comprises a method of providing incentive to play gaming devices connected by a network to a host computer. The method comprises first designating an earning time period and a non-overlapping and non-contiguous redeeming time period, where the earning time period and redeeming time period having a time gap therebetween. A system then tracks the level of gaming-device play during the earning time period and accrues credits according to the level of gaming-device play tracked. The accrued credits are prevented from being used until the redeeming time period, but are permitted to be used on one of the gaming devices during the redeeming time period. The preferred embodiment contemplates accruing credits just before a show and only being able to use the credits just after the show lets out.

The foregoing and other objects, features and advantages of the invention will become more readily apparent from the following detailed description of a preferred embodiment of the invention that proceeds with reference to the accompanying drawings.

DETAILED DESCRIPTION

Figure 1:
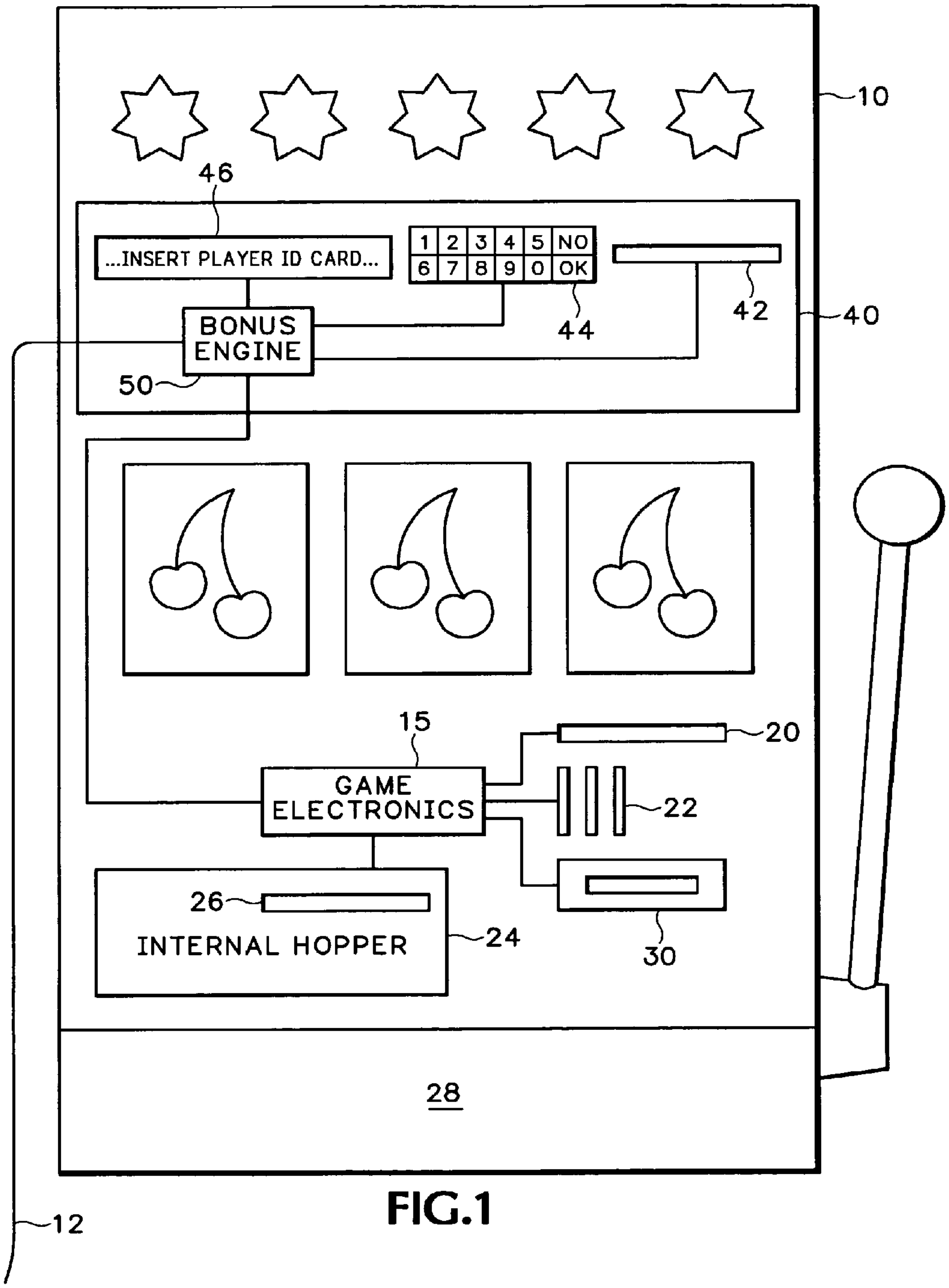
FIG. 1 is a diagram showing a gaming device including a ticket printer according to embodiments of the invention.

Embodiments of the invention include a player tracking system that communicates to a player in various ways, one of which is via a ticket printer. The ticket printer can be embodied either as a standalone system printer separate from the gaming device, or could be embodied by performing special ticket printing functions on a standard game printer already found in a typical gaming device.

If the particular player has identified himself or herself to the gaming network, then the player tracking system has a very high probability that it is communicating to a particular player. Therefore, the ticket printer operates as a direct communication conduit to a player.

The ticket printer, whether it is operating on a standard game printer or as a separate system printer, is controlled by functions and processes running either at the gaming device itself, or the functions and processes may be running on a promotion, bonus, or other server and communicated to the particular printer over the gaming network, as described in detail below.

The printing functions that cause the system tickets to be printed can operate according to a number of factors, all of which can be specifically tailored depending on various data inputs. For instance, the data input could come from the player's identification, various data about the current game, such as the number of bonuses or lack of winning. The length of a current gaming session could also be considered. Additionally, the data could come from historical records of the specific player, a subset of players, or data about all the players historically or even those currently on the game network. Still further, the input factors to cause printed tickets may include time of day, day of week, month of year, etc. Special promotions could also use the ticket printer to directly communicate with players. Functions can include any or all of this information in a decision to cause the printer to communicate directly with the player by printing a particular ticket. Details of the functions and the data events that trigger generating the system ticket are discussed in detail below. Although the object printed by the ticket printer will be referred to herein as a ticket, the object can be printed on almost any type of substrate, have almost any size, and contain almost any type of writing on it. Preferably, however, the object printed has a form factor equivalent to paper currency so that the same bill reader used to accept inputs at gaming machines and kiosks can also be used to accept award tickets. In this way, award tickets can be printed out and immediately inserted within the bill acceptor at any gaming machine whereby the award associated with the ticket is credited to the player account at the machine for continued play.

Embodiments of the invention also extend to redemption of promotional tickets and other promotional items. Once a player has a promotional item, the player may redeem it by inserting it into the validator of the gaming device. When the ticket item is associated with a particular player, the validator communicates to a central data system to determine if the player is eligible to receive the promotional item. If so, the validator accepts the item and a benefit is provided to the player, such as additional machine credits or bonus points. If the ticket award is simply used as a cashless award instrument, the player identity may not be important and the award amount reflected on the ticket is simply credited to the machine when the ticket is inserted.

As used in this description, a pay table of a gaming device is the standard winnings paid or credited to the player by the device itself. A bonus award is machine credits either credited to a machine or credited to a player account by a bonus system, or bonus points credited to a player account by the bonus system. A system award is a benefit that is paid or credited to a player of a gaming device that is not based on either the pay table of the gaming device or a bonus award. Examples of a system award include a complementary meal or show ticket, a drawing ticket, or bonus points or machine credits not based on either a gaming device pay table or a bonus award.

In a preferred embodiment, the system award includes a mystery award represented by a ticket which does not include indicia printed thereon representative of the ticket's specific value. Only when the mystery ticket is redeemed at a ticket reader is the award value uncovered and awarded to the player.

Turning to FIG. 1, a gaming device 10 according to an embodiment of the invention is shown. The gaming device 10 includes a bill acceptor 20 that accepts and validates bills, tickets or vouchers. Bill validators operate by scanning barcodes or other identifying features on tickets or vouchers, and by examining printing or other security features on paper currency to determine authenticity. Bill validators are well known in the gaming arts.

The gaming device 10 also includes one or more coin slots 22 for accepting coins or tokens. An internal hopper 24 temporarily stores coins or tokens for later payment to the player through a payout bin 28, if the player chooses to cash out in such a manner. Bills can also be stored in a separate hopper, and dispensed to the player through the bill acceptor 20 or through another bill slot 26 in the hopper 24, similar to an ATM machine.

A set of game electronics 15 manages the central operations of the gaming device 10. For example, the game electronics 15 counts the monetary value input into the game 10, and tracks and stores values for this and other data items. The game electronics 15 also control the game play of the gaming device 10, such as by accepting user input from various buttons (not shown) to cause credits to be wagered, as well as cause motors to spin the game wheels, speakers to generate sound, and circuits to generate lights or video signals. The game electronics 15 may be a main board that interfaces with various controller boards that control specific functions in the gaming device 10, or may control the various devices directly.

One of the items controlled by the game electronics 15 is an internal game printer 30. The game printer 30 can be of any type known in the art, such as impact, inkjet, thermal, laser, and can be a color printer or standard black and white. Even if the game printer 30 is only capable of printing in a single color, cardstock or paper used by the printer could be preprinted in color.

The game printer 30 is used for "cashing out" machine credits when a player wants to end game play or to move to another machine. A player cashes out by selecting appropriate buttons on the gaming device 10, and then by indicating if he or she wants to be paid out in cash or in voucher. If the player desires to be cashed out in cash, bills can be ejected through the bill acceptor 20 or bill slot 26 of the internal hopper 24, or coins or tokens can drop from the hopper 24 into the payout bin 28. If the player wishes to cash out with a voucher or ticket, such a voucher can be printed by the game printer 30. The voucher can then be taken to a casino attendant to be converted to cash, or could be inserted into the bill acceptor 20 of another gaming device 10, which validates the voucher and transfers the value to the credit meter of the new game.

In addition to printing tickets related to game and bonus functions, such as a cashout voucher, the game printer 30 can print tickets for bonus awards and system awards as well. Detailed discussion of the tickets and awards follows.

The gaming device 10 also includes game-mounted components of a player tracking system. The components are generally shown affixed to a frame 40, which is mounted to the gaming device 10. Although components of the tracking system interact with the gaming device 10, it is a separate system from the gaming device.

The player tracking system includes a set of electronic inputs and outputs for interfacing with the player. For example, in the gaming device shown in FIG. 1, portions of the player tracking system mounted to the frame 40 include a cardslot with a card reader 42, a keypad 44, and a text display screen 46. The display screen 46 may be a fluorescent type or LED type text display, for instance. A player of the gaming device 10 uses a card and/or a PIN code to identify himself or herself to the player tracking system. Monetary value can be entered into the game, either from the ID card itself, from a credit-card account with a bank or from a special gaming account managed by a casino. Alternatively, a player can use the card and/or PIN code to identify himself or herself, and then put credits on the machine by depositing coins, tokens, bills, or tickets/vouchers into the machine.

The card reader 42, keypad 44 and screen 46 are managed by functions operating on a "bonus engine" 50, which is a specialized piece of hardware used in the player tracking network. The bonus engine 50 is coupled by a computer connection to the gaming network, and plays a central role in the player tracking system. The bonus engine 50 is in constant communication between the game electronics 15 and the gaming network. The bonus engine 50 receives constant status updates about the state and status of the game device 10. The game electronics 15 may automatically send information to the bonus engine 50, such as "events", when the events occur, such as at the end of the game, or when a key event happens like a coin being accepted into the gaming device 10. Or, the bonus engine 50 may send electronic updates, requests, or polls to the game electronics 15. When polled, the game electronics 15 sends the latest events to the bonus engine 50. Additionally, the gaming network can send commands and directives to a particular gaming device 10 through the bonus engine 50 of that device. The bonus engine 50 then performs the commands, such as by displaying a message on the display 46, or the bonus engine delivers the commands to the game electronics 15 of that gaming device.

Bonusing and bonus awards are well known in the gaming industry. For example, some bonus awards are described in U.S. Pat. Nos. 5,655,961; 5,836,817; 5,752,882; 5,820,459; 6,257,981; 6,319,125; 6,254,483; 6,364,768; 6,358,149; 5,876,284; 6,231,445; 6,375,569; 6,244,958; 6,431,983; 6,371,852; 6,375,567, all of which are assigned to the assignee of the present invention, and the teachings of all of which are incorporated herein by reference for all purposes.

One of the commands that can be either generated by the bonus engine 50 or sent to the bonus engine by the gaming network is a command indicating a bonus award or a system award should be generated. Hereinafter, the word "award" will indicate either a system award or a bonus award, and the two types will not be differentiated unless a particular type of award is being discussed. As discussed below, the bonus engine 50 is structured to either print the award ticket directly on the game printer 30 or on a separate system printer. In other embodiments, the bonus engine 50 is structured to send appropriate commands to the game electronics 15 to cause the award to be printed on the game printer 30.

Figure 2:
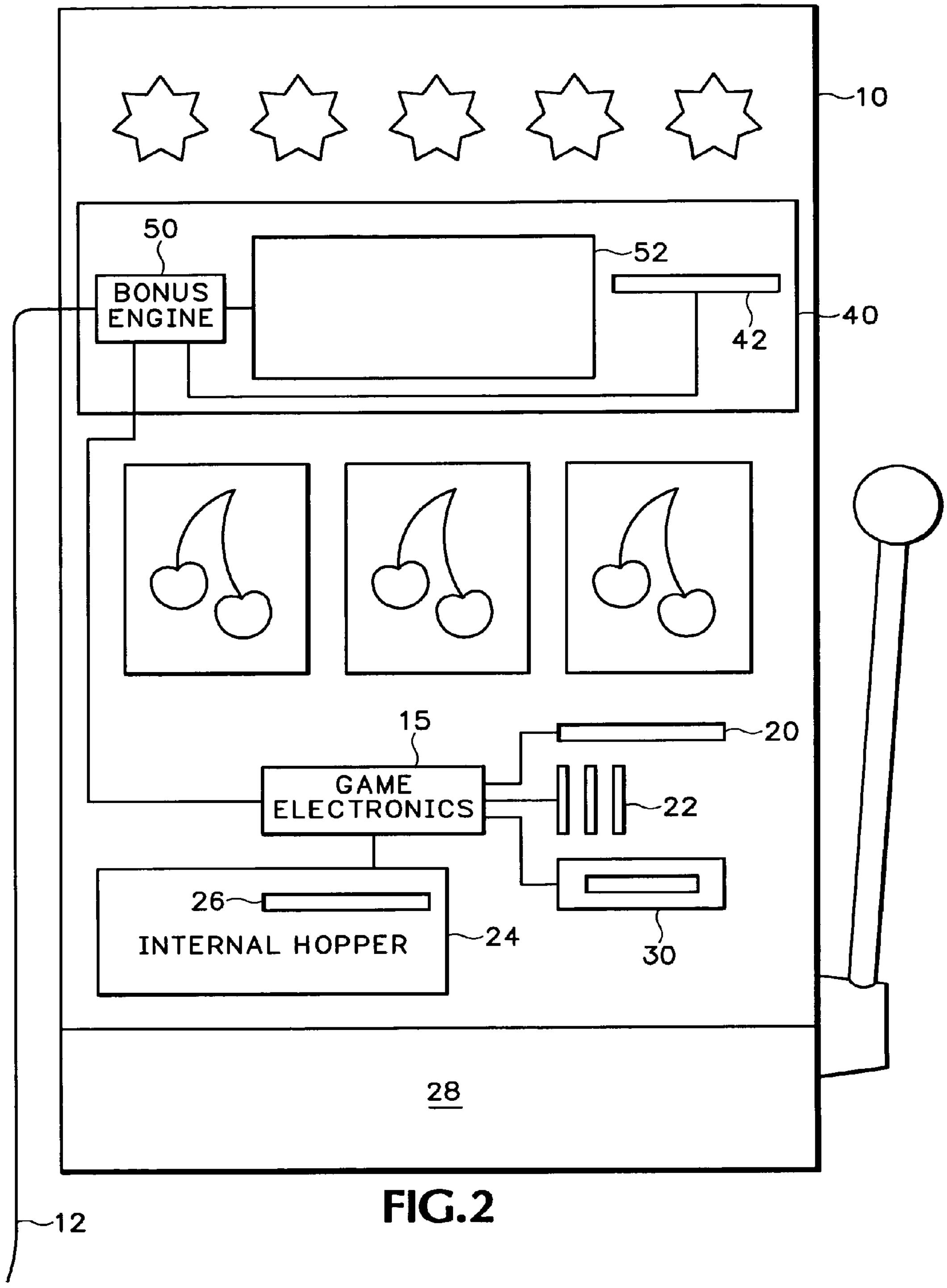
FIG. 2 is a diagram showing a gaming device including a ticket printer, but having a different player communication system than the gaming device of FIG. 1.

FIG. 2 shows a gaming machine 10 having a different player tracking configuration than the gaming machine of FIG. 1. Specifically, the input and display functions of the keypad 44 and display 46 of FIG. 1 are performed by a touchscreen display 52, such as a Liquid Crystal Display (LCD). A detailed description of such a touchscreen display 52 is described in U.S. patent application Ser. No. 10/170,238, filed on Jun. 11, 2002, and is incorporated herein by reference for all purposes. As described in the 10/170,238 application, the bonus engine 50 manages the touchscreen display 52, and card reader 40, as well as provides the bonusing and other functions described above.

Figure 3:
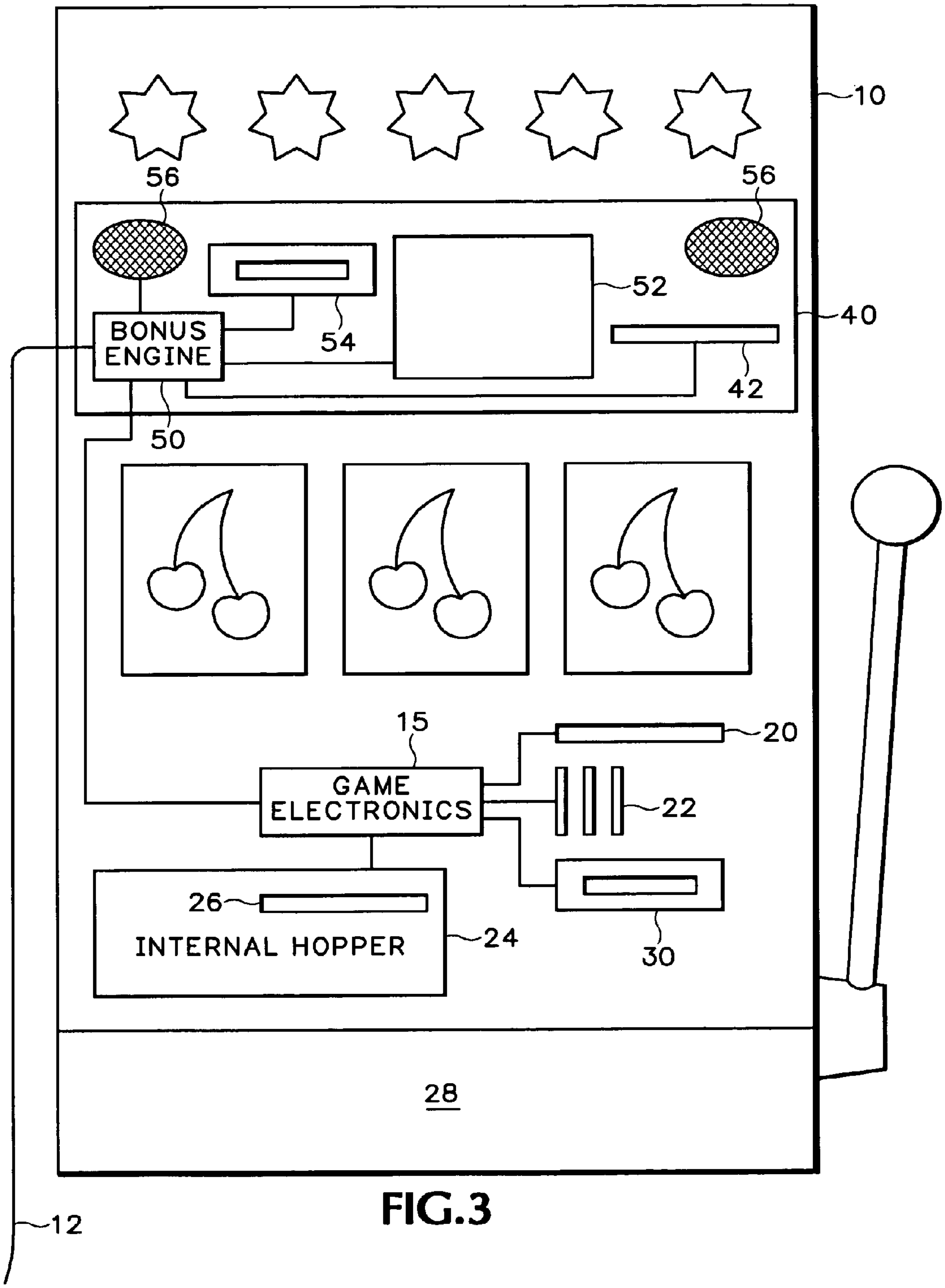
FIG. 3 is a diagram showing a gaming device including a game ticket printer and a system ticket printer, according to a further embodiment of the invention.

FIG. 3 shows yet another variation of the gaming device 10. This variation includes a system printer 54 and speakers 56 mounted to the frame 40 of the player tracking system. The system printer 54 and speakers 56 are also coupled to and managed by the bonus engine 50. The system printer 54 works in conjunction with the game printer 30 in that the system printer 54 prints the awards while the game printer 30 prints the traditional game cashout vouchers. The system printer 54 may be decoupled from the gaming device 10 and serve as a backroom promotions printer. Mystery tickets printed by the printer would then be given to prospective players by mail, by manual hand-out, or issued by award kiosks to encourage such players to visit the casino. The speakers 56 can be made to produce sounds or music by the bonus engine 50. Although only shown in FIG. 3, the speakers 56 could be present on any of the gaming devices depicted in FIG. 1, 2, or 3, although they need not be present on all embodiments of the invention.

Although the gaming devices 10 of the FIG. 1, 2 or 3 are all different, they are each capable of performing embodiments of the invention. Although the specific hardware included in the gaming device 10 is important in implementing embodiments of the invention, the invention can operate regardless of the type of components in the gaming device 10.

Figure 4:
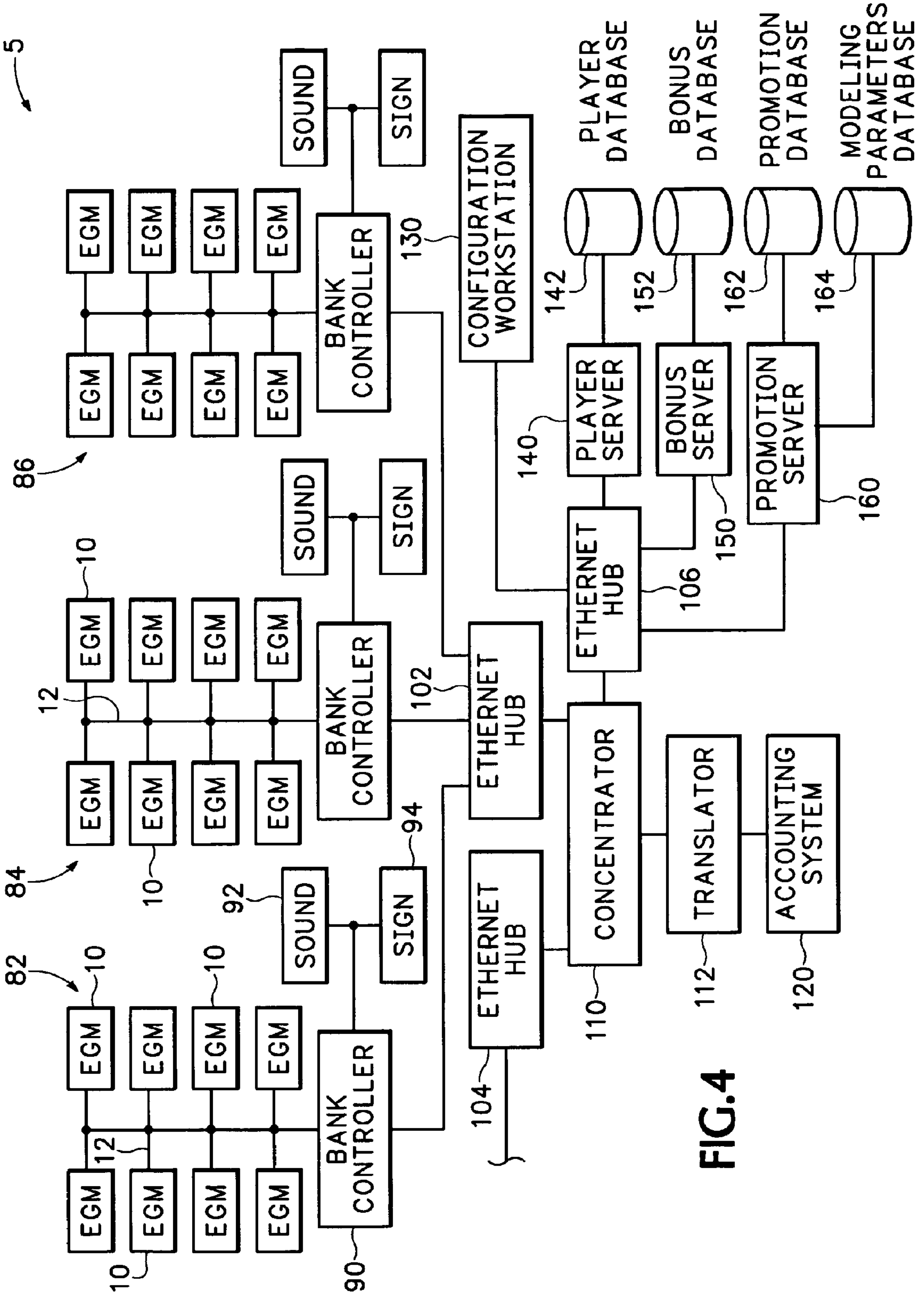
FIG. 4 is a block diagram showing a network of gaming devices including a promotion function according to embodiments of the invention.

As mentioned above, the gaming device 10 shown in FIGS. 1, 2, and 3 operates in conjunction with a gaming network. An example modern gaming network 5 is shown in FIG. 4. FIG. 4 is similar to FIG. 1 of U.S. Pat. No. 6,254,483B1, assigned to the assignee of the present invention, the teachings of which are incorporated herein in their entirety for all purposes. In FIG. 4, several gaming devices 10 (Electronic Gaming Machines, or EGMs) are coupled together in groups called banks. The three banks illustrated in FIG. 4 are referenced as 82, 84, and 86, although any number of banks could be present in the gaming network 5.

Each of the gaming devices 10 in each bank are coupled to a bank controller 90 by the communication cable 12. Each bank controller 90 includes a processor that facilitates data communication between the gaming devices 10 in its associated bank and the other components on the network. The bank controller 90 can also include audio capabilities, like a CD or DVD ROM drive coupled to an audio board or sound card for transmitting digitized sound effects, such as music and the like, to a sound system 92 coupled to the bank controller. The bank controller 90 can also be connected to an electronic sign or screen 94 that displays information, such as scrolling, flashing, or other types of messages that indicate progressive jackpot amounts and the like, which are visible to players of machines on a particular bank. These message displays 94 are generated and changed responsive to commands issued over the network 5 to the bank controller 90. Each of the other banks 84 and 86 include associated bank controllers, sound systems, and signs as shown, which operate in substantially the same manner. The sounds and images created by the bank controller may be identical for each of the banks 82, 84, 86, or all of sounds and images created by the banks may be different than the others.

A network connector, such as an Ethernet hub 102 connects each of the bank controllers 90 to a concentrator 110. Another Ethernet hub 104 connects similar bank controllers (not shown), each associated with an additional bank of gaming devices 10 (also not shown), to the concentrator 110. The concentrator 110 functions as a data control switch to route data from each of the banks to a translator 112. The translator 112 includes a compatibility buffer between the concentrator 110 and a proprietary accounting system 120. The translator 112 functions to place all the data gathered from each of the bank controllers 90 into a format compatible with the accounting system 120. The translator 112 could be implemented by a microcomputer including a microprocessor and operating system, such as an Intel Pentium microprocessor running Microsoft Windows NT 4.0.

Another Ethernet hub 106 is connected to a configuration workstation 130, a player server 140, a bonus server 150 and a promotion server 160. Hub 106 facilitates data flow to or from the configuration workstation 130 and the servers 140, 150, and 160. Additionally, the servers 140, 150, and 160 communicate through the concentrator 110 to the bank controllers 90, which, in turn, communicate with the particular gaming devices 10.

The configuration workstation 130 has a user interface that allows portions of the network 5 and the servers 140, 150, and 160 to be set up and modified. The configuration workstation 130 could include a personal computer having a keyboard, monitor, microprocessor, memory, an operating system, and a network card coupled to the Ethernet hub 102.

The player server 140 includes a microcomputer that is used to track data of players using the gaming devices 10. The player server 140 is coupled to a player database 142 where the player tracking data is stored. Another function of the player server 140 is to control messages that appear on displays 46 or 52 associated with each gaming device 10 and the messages on the signs 94 coupled to the bank server 90. The player server 140 may be embodied in a microcomputer including, for instance an Intel Pentium Processor, Microsoft operating system and a network card to couple the server to the Ethernet hub 106.

The bonus server 150 is embodied by a microcomputer and is used to control bonus applications or bonus systems on the gaming network 5. The bonus server 150 is coupled to a database 152 where bonus data is stored. The bonus server 150 implements a set of rules for awarding jackpots in excess of those established by the winning pay tables of each gaming device 10. Some bonus awards may be made randomly, while others may be made to link to groups of gaming devices 10 operating in a progressive jackpot mode. Specific examples of such bonuses and networks used to implement them include those as described in U.S. patents mentioned above and previously incorporated.

In one embodiment of the invention, the bonus server 150 has operable thereon a cashless award server adapted to translate bonus events determined under jackpot rules stored in database 152 into cashless instrument print commands sent over gaming network 5. These print commands are received by the appropriate gaming machine(s) 10 and operate to cause, in a preferred embodiment, a bonus ticket to be immediately printed via game printer 30 with the appropriate printed indicia thereon.

In another embodiment of the invention, a sniffer board (not shown) interposed between the bonus server 150 and EGMs 10 can read but not necessarily interrupt the flow of bonus instructions from bonus server 150. Such intercepted instructions are then translated by the sniffer board to print commands for the printer network to provide printed tickets at the gaming machines 10 or other areas of gaming network 5 reflecting the bonus award.

In yet another embodiment of the invention (called a "two-wire network configuration"), a secondary network supplementing the gaming network 5 is provided to handle TITO transactions. In this embodiment, a second communication port is provided on each EGM 10 with some control over the game printer 30. Instructions sent over the "two-wire network" are then separate with the existing slot accounting/player tracking network 5 connection to the game and processes real-time transactions directly. In this embodiment, secondary and independent versions of a bonus server with ticket server, similar to server 150, and hubs and controllers 102, 90 are coupled to the second communication ports on the EGMs 10. Printers, such as a transaction report printer and redemption scanners and printers in cashier cages, are provided.

The promotion server 160 is coupled to a promotion database 162 and a modeling parameters database 164. The promotion server 160 includes functions and processes operative to generate signals to cause a system award to be generated and to communicate the generated system award to the particular gaming device 10 at which the player receiving the award can receive the award.

Data of different types of system and/or bonus awards and how and when the awards are generated can be stored in the promotion database 162. For instance, the text and/or graphics that are printed on an award, or bar-codes that are printed on the award ticket, can be stored on the promotion database 162. Modeling parameters and data can be stored on the modeling parameters database 164. For instance, triggering conditions that when satisfied cause a ticket to be generated can be stored on this database. Such data could include the number of hours a player must play at a requisite coin-in level to cause a complementary meal ticket to be awarded to the player. Many examples of system awards and parameters used to implement them are discussed in detail below.

In determining when to grant a bonus or system award, the promotion server 160 can access data stored anywhere on the network looking for triggering events, such as: from any of the databases 142, 152, 162 and 164; from the configuration workstation 130; from the bank controller 90; from the accounting system 120; and from the bonus engine 50 on any or all of the gaming devices 10 coupled to the computer network 5. Additionally, the computer network 5 illustrated in FIG. 4 is only an example gaming network. Those skilled in the art will appreciate that embodiments of the invention can operate on any acceptable network, even if it differs from the one illustrated in FIG. 4.

Figure 8:
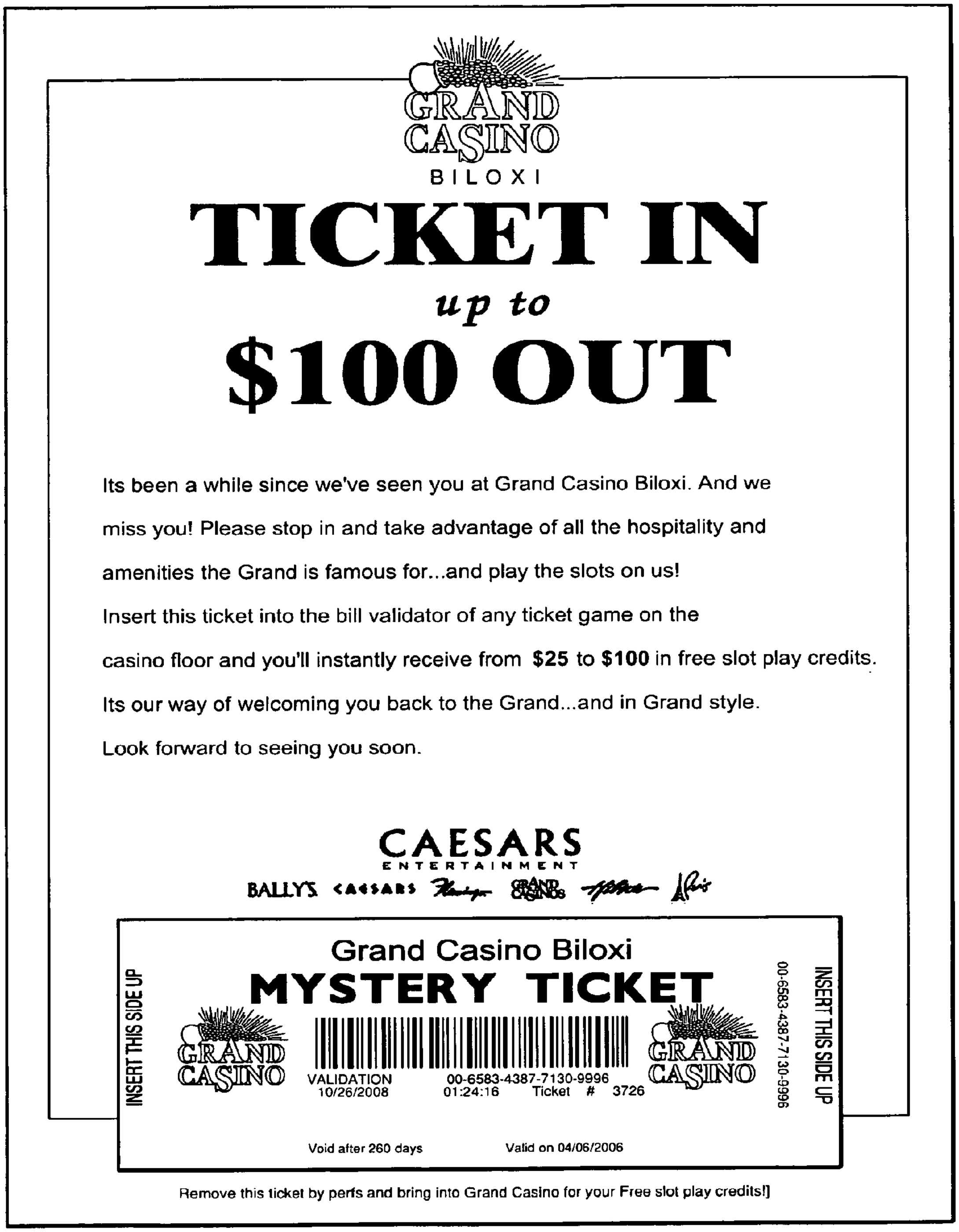
FIGS. 8-10 are examples of tickets that can be issued by embodiments of the invention.

In a preferred embodiment, promotion server 160 is programmed to issue a print command to system printer 54 causing to be issued a mystery ticket (see, e.g., FIG. 8). Server 160 has stored thereon trigger conditions and award schemes used in such bonuses. Trigger conditions include, but are not limited to, the trigger definitions set forth in Table 1 below. As an example, player demographics and currency of play (e.g. where the player is over 50 years old and has not visited the casino in 6 months) may cause the trigger condition to occur resulting in a mystery ticket printout. The bonus scheme may include a fixed amount for the ticket upon ticket generation, an association upon generation of a range of possible values for the ticket that are only later fixed upon ticket redemption, a set of rules for selecting a specific value of the ticket from a range of values depending upon criterion selected from the group consisting of time of day ticket redeemed, date, player rating, and the ticket printer location. A mystery ticket may therefore have one value for one player and a different value for another player. That is, the award scheme associated with the ticket ID code could state that a Tier 1 player would be entitled to a $100 bonus upon insertion while a Tier 4 player would only be entitled to $25. The printed, human-readable indicia on the ticket would only reflect that the ticket is value between $25 and $100 as reflected in FIG. 8.

When the promotion server 160 determines that a triggering event has been satisfied and that an award should be generated, it sends appropriate signals to the bonus engine 50 of the appropriate gaming device 10 through the gaming network 5 to deliver the award. As discussed above, one such method of award delivery is to cause an award ticket to be printed for the player. In the alternative, the ticket may be printed at a remote system printer and hand delivered to a player to encourage them to start or keep playing.

Figure 5:
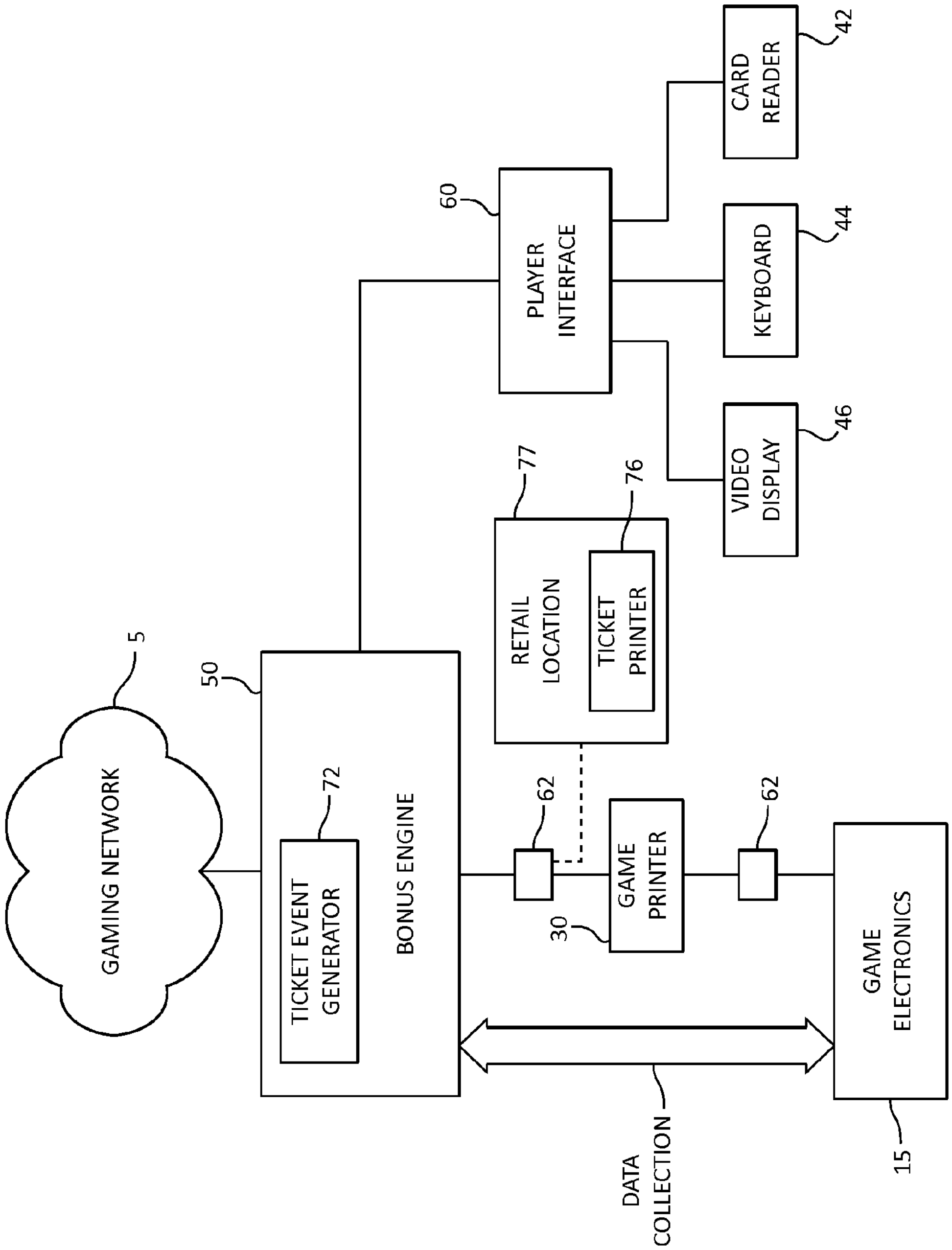
FIG. 5 is a functional block diagram showing processes and functions used in the gaming device of FIGS. 1 and 2.
Figure 6:
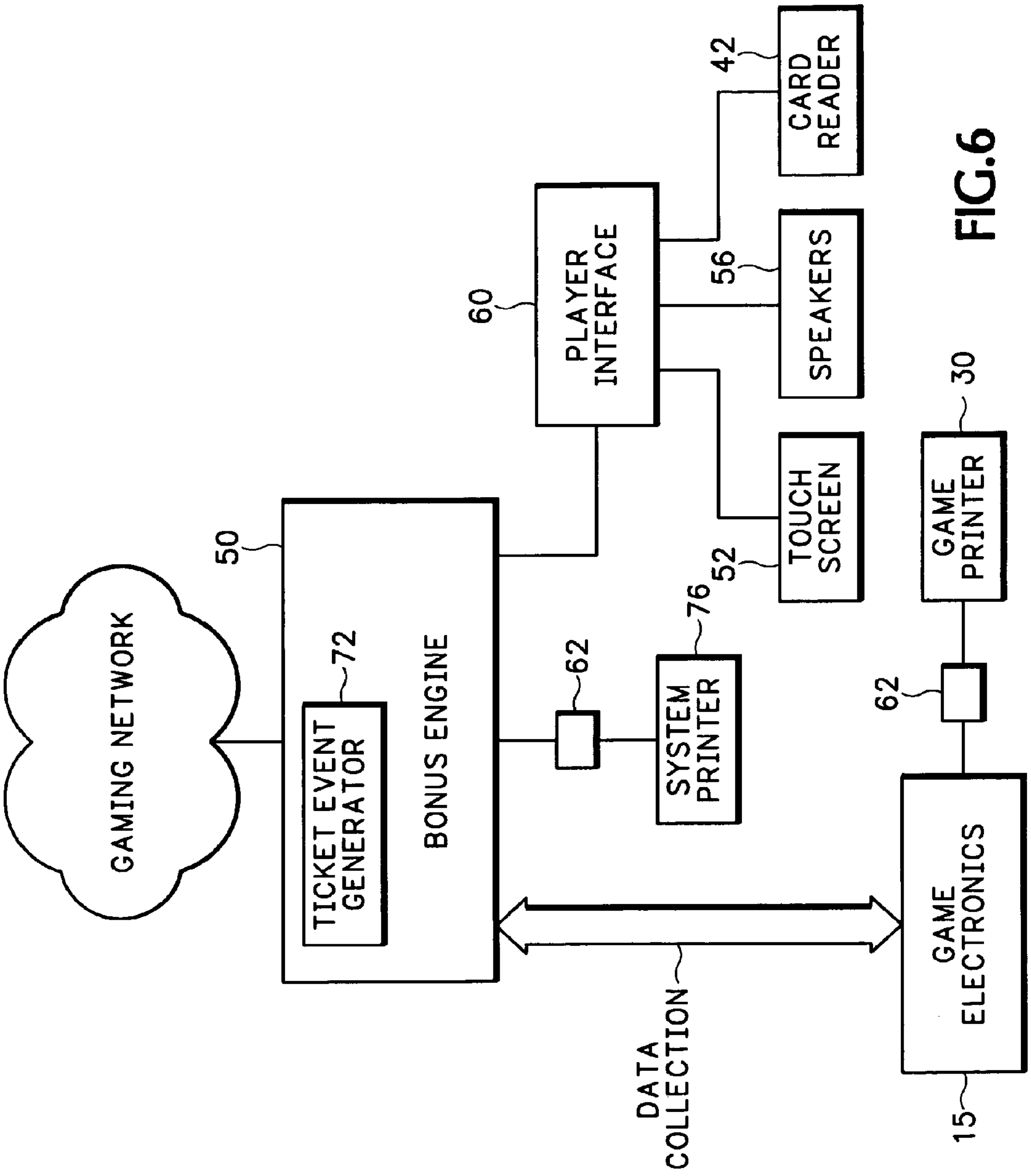
FIG. 6 is a functional block diagram showing processes and functions used in the gaming device of FIG. 3.

Details of how the bonus engine 50 causes the award tickets to be printed are shown in FIGS. 5 and 6. These figures are sample block diagrams showing example control functions and data connections between components of the gaming device 10 of FIG. 1. Functions operating on the illustrated components may be implemented in any way, such as by standalone hardware circuits, software processes running on a dedicated or shared processor, firmware, etc. or a combination of those implementations. Similarly, the functions could be procedures running on a general purpose or specialty microprocessor. Further, although components are shown as distinct interconnected components, the functions that are represented may operate in conjunction with one another in an overlapping manner.

As shown in FIG. 5, the bonus engine 50 is coupled directly to a data cable 12, which, in turn is coupled to the gaming network 5. The data cable 12 allows the bonus engine 50 to communicate game and player events to the game network 5. Additionally, the game network 5 sends commands and data to be performed or managed by the bonus engine 50.

The bonus engine 50 is coupled to the game electronics 15 through a data collection link, shown as a double arrow. The bonus engine 50 and the game electronics 15 may communicate using a data collection protocol, such as a Slot Accounting System protocol, or by any other acceptable protocol.

The bonus engine 50 is additionally coupled to the set of player communication tools—the card reader 42, keyboard 44 and text display 46. In some embodiments, the bonus engine 50 may be coupled to these player communication tools through a separate player interface 60, which routes commands and data from the bonus engine 50 to the appropriate tool. In other embodiments, the bonus engine 50 controls these operations itself, and no separate player interface 60 is necessary.

Within the bonus engine 50 is a ticket event generator 72. The ticket event generator is operative to cause the system award ticket or bonus award ticket to be printed. As discussed above, the granting of an award may occur on the promotion server 160, the bonus server 150, or may occur on the bonus engine 50, or some portions of the grant may occur on either the promotion or bonus server and on the bonus engine. For instance the bonus engine 50 may monitor events from the game electronics 15 and grant a special award when an award-causing (triggering) event occurs—without first sending data to the promotion server 160. Of course, once the award was generated, the bonus engine 50 would send the appropriate data to the gaming network 5, and specifically to the player server 140, bonus server 150, promotion server 160, and the accounting system 120.

The bonus engine 50 may be coupled directly to the game printer 30, or may be connected to a game printer interface 62 that in turn is coupled to the game printer 30. In either such an embodiment, the bonus engine 50 can generate requests to print award tickets and have them printed directly on the game printer 30, without sending intermediate commands to the game electronics 15. The bonus engine 50 or printer interface 62 may communicate directly to a port on the printer using a serial or parallel printing protocol, for instance. Alternatively, the print requests may be generated by the promotion server 160 or elsewhere on the gaming network 5, and communicated to the bonus engine 50 over the data cable 12. The bonus engine 50 in turn can then send appropriate commands to the printer interface 62 to control the game printer 30 to print the desired ticket.

In another embodiment, also shown in FIG. 5, the bonus engine 50 sends the print commands to the set of game electronics 15 over the data connection link, rather than controlling the game printer 30 directly. Once the game electronics 15 receives the print command from the bonus engine 50, it performs any necessary translation and sends the appropriate signals to the game printer 30 to print the award ticket. As above, the game electronics may be connected to the game printer through a game printer interface 62, which may or may not be identical to the game printer interface coupled to the bonus engine 50.

Therefore, in operation as illustrated in FIG. 5, the bonus engine 50 either generates or receives a command from the gaming network 5 to print an award. Once the command is generated or received, the bonus engine 50 either prints the award ticket directly on the game printer 30, or sends appropriate commands to the set of game electronics 15 to have the award ticket printed.

FIG. 6 illustrates an embodiment of the invention that includes two printers attached to the gaming device 10—a standard game printer 30 and a system printer 54. As discussed above with reference to FIG. 3, the system printer 54 can be identical to or different from the standard game printer 30.

As shown in FIG. 6, the bonus engine 50 is coupled directly to a system printer interface 64, which in turn is coupled to the system printer 54. In some embodiments, the functions of the printer interface 64 are built directly into the bonus engine 50 so that a separate printer interface is unnecessary. As in the other embodiments, the game electronics 15 are still connected to the standard game printer 30, and are used to print standard game items, such as cash-out vouchers. In this embodiment, the system printer 54 is controlled by the bonus engine 50 solely to print system and bonus awards.

Also different from the gaming device shown in FIG. 5 is that the gaming device 10 of FIG. 6 is coupled to the touchscreen 52 and speakers 56 that were described with reference to FIG. 3. As described above, embodiments of the invention are capable of operating equally no matter the type of system used to communicate with the player of the gaming device 10.

Figure 7:
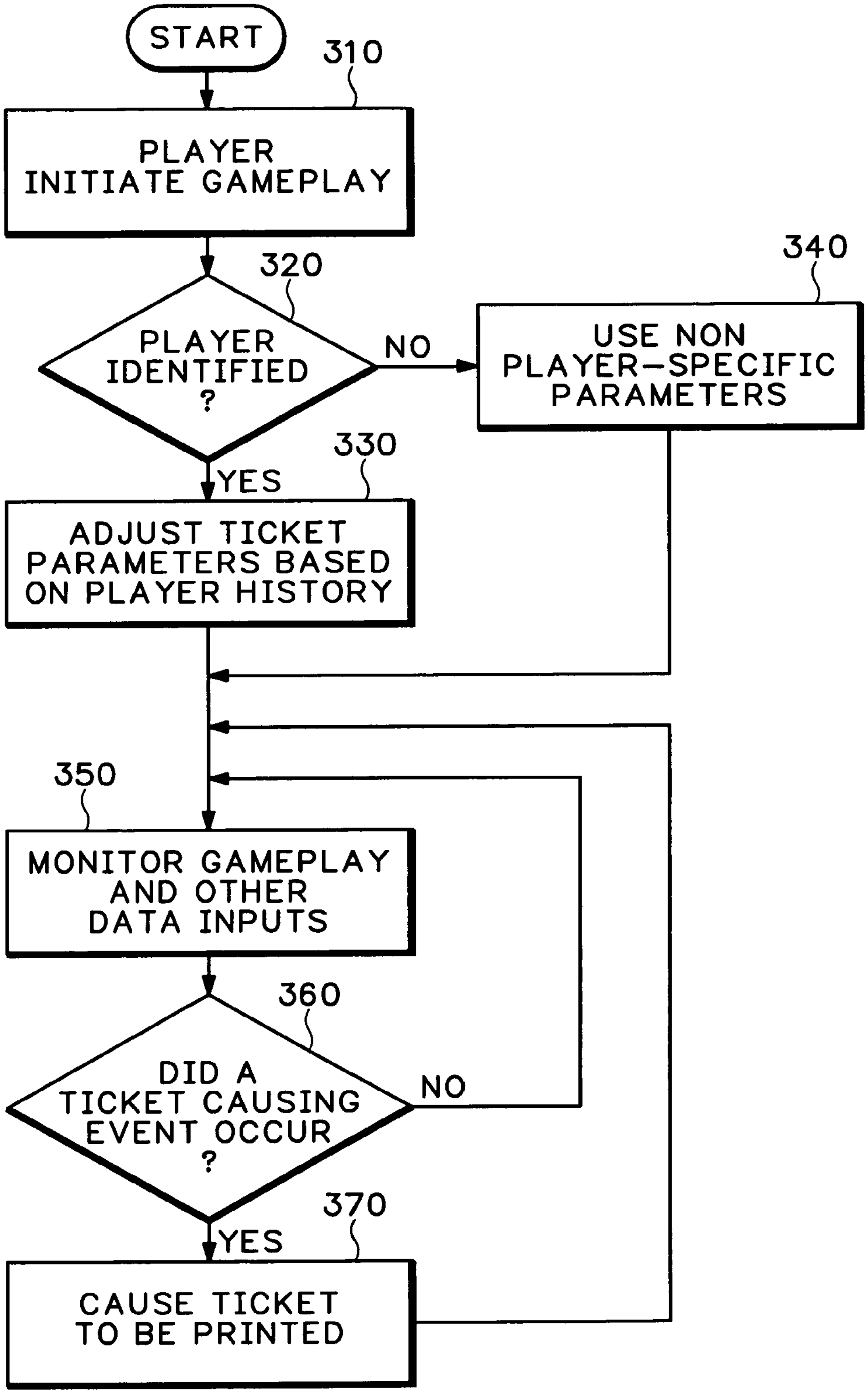
FIG. 7 is an example flow diagram showing processes that can be performed by the ticket printer function of FIGS. 4-6.

FIG. 7 is an example flow diagram illustrating processes that can be used by the promotion server 160 or ticket event generator 72 to cause an award to be generated and an award ticket printed at a gaming device 10. For brevity, functions relating to generating an award will be referred to as occurring on the promotion server 160, although they could be performed on either the promotion server, bonus server 150, bonus engine 50, or elsewhere in the computer network 5. Similarly, printing awards will be referred to as being printed on a system printer 76, although they could also be printed on a game printer 30, either under direct control of the bonus engine 50, or under control of the game electronics 15 after receiving commands and data from the bonus engine.

A flow 300 begins at a process 310 where a player initiates gameplay on a gaming device 10 that is coupled to the gaming network 5. A player may initiate gameplay by entering coins or bills into the gaming device 10, or by using a card and/or PIN number to transfer money from a casino account, for example.

A check is made at 320 to see if the player has been identified to the gaming network 5, either as a new player or as a returning player. If the player is so identified, a process 330 loads data from the player database 142, and/or adjusts parameters in the promotion server 160. Otherwise, a process 340 loads non-player specific parameters to the promotion server 160. In some embodiments, the process 340 is presumed, and the non-player specific parameters are pre-loaded into the promotion server 160 when the function begins, and are only overwritten if there is in fact data about the current player stored in the player database 142. Information from the promotional server 160 may be also used by the bonus server 150.

A process 350 monitors gameplay as well as other data inputs. Some of the other data inputs can include time of day, and the presence of special promotions, for example. In implementation, the other data inputs can include a large variety of inputs, which are described in detail below.

If a check 360 does not find a ticket causing event to have occurred, then the flow 300 simply loops back to the process 350, and the monitoring continues. If, instead the check 360 finds that a ticket causing event occurred, then the promotion server 160 or bonus server 150 loads the appropriate data and sends a signal to the bonus engine 50 of the appropriate gaming device 10 to cause the printer 76 to print an award ticket. For instance, if a player has played for over 3 hours at a requisite level, the promotion server 160 may cause a ticket for a free meal (a complementary or "comp" meal) to be printed at the game device 10 where the player is currently playing. Alternately, if the trigger is related to a bonus event—such as a Lucky Coin event where the cumulative coin in across game bank 82 is tracked and the player is responsible for the 10,000$^{th}$ coin-in at the bank—then the bonus server 150 may cause a ticket of the designated bonus amount (e.g. a $100 bonus award) to be printed at the game device 10 where the player is currently playing. In the preferred embodiment, the ticket generated would be a mystery ticket that includes machine-readable indicia (e.g. bar code, information written on magnetic stripe, etc.) and human-readable indicia corresponding to a range of possible values of said ticket with no specific value indicated.

In other embodiments, the ticket printer can also be used as a vehicle to issue a receipt. For instance, a ticket could be printed at a gaming machine that confirms a transfer of funds or credits to a player. For example, if a player electronically transferred funds into a player account, the ticket printer could be used to print a receipt that confirms how much the player transferred, and/or how much is remaining in the player's account.

Triggering Events

Generally, using the award system described above, an award is generated after an award triggering event occurs. As described above, a trigger event occurs when conditions caused by the customer, the game itself or gaming network satisfy one or more pre-set conditions. The pre-set conditions are "triggers", and when a trigger's conditions are satisfied, the trigger event occurs.

The triggers are typically static, such as awarding a complementary meal coupon when a player has a requisite amount of coin-in over a meal period. Other triggers can be dynamic or based on dynamic variables, such as awarding a free return play to the top 10% of players in a casino or group of casinos over a given time period.

A list of example groups of triggering events is listed below in Table 1.

TABLE 1

List of Trigger Groups, by type:

| Machine Outcome | Player Behavior | Random Triggers |
|---|---|---|
| Specific Game Outcomes | Points Earned | Lucky Coin |
| Series of Game Outcomes | Win/Loss Per Unit of Time | Lucky Time |
| Sets of Game Outcomes | Visitation Frequency | Lucky Game |
| Consecutive Game Outcomes | Handle Per Unit of Time | Electronic Drawing |
| X outcomes in N tries | Continuous Play | |
| Outcome sets/unit time | Specific Player Demographics | |
| Outcomes relative to others | Sets of Player Demographics | |

Trigger Definitions:

A "Specific Game Outcomes" triggering event occurs when the player obtains a predefined result on a game on the gaming device. Examples include, for instance, a "four-of-a-kind" (or a particular four, such as four aces) in a poker game, "seven-seven-seven" in a slot game, or obtaining a particular bonus symbol on one of the reels. An award can be generated when any particular predefined outcome of the game is met.

A "Series of Game Outcomes" triggering event occurs when the player obtains certain results during multiple plays on the gaming machine device in a predetermined order. One example is where a player obtains, on a video poker machine, a pair, two pairs, three-of-a kind, straight, and flush in that order but not necessarily consecutively. An award can be generated when any predefined series of results is met.

A "Sets of Game Outcomes" triggering event occurs when the player obtains certain results during multiple plays on the gaming machine regardless of order. Examples include a player receiving his/her fourth four-of-a-kind on a video poker machine, or a player obtaining jackpot payouts on each of the possible paylines in a slot-based game. An award can be generated when the last in the predefined set of results is met.

A "Consecutive Game Outcomes" triggering event occurs when the player obtains certain consecutive results during multiple plays on the gaming machine. Examples include a player winning on five consecutive hands or receiving two consecutive hands containing a minimum level of win (such as three-of-a-kind) on a video poker machine, or where a player receives a particular bonus symbol on the payline of a slot machine three consecutive times. An award can be generated when the last of the predefined consecutive game outcomes is met.

An "X Outcomes in N Tries" triggering event occurs when the player obtains certain results during multiple plays on the gaming machine within a certain number of tries. Examples include a player obtaining a both a straight and a flush within five games of one another, but not necessarily consecutively or in that order, or where a player obtains seven-seven-seven during the first 50 plays of a particular slot machine. An award can be generated when the "xth" outcome is reached by the player.

An "Outcome Sets/Unit Time" triggering event occurs when a player obtains certain results during multiple plays on the gaming machine primary game within a set period of time. Examples include a player obtaining 10 jackpot awards on a slot machine within a ten minute period, and a player obtaining three flushes within a one-hour period on a video poker machine. This type of trigger allows the operator to specify the game outcomes and the time limit required for the trigger.

An "Outcomes Relative to Others" triggering event occurs when a player obtains a certain result or results on the gaming device before (or after) other players at a specified group of games. Examples include the first player in a bank of video poker machines to receive a four-of-a-kind of Aces, or the first one to twenty wins.

A "Points Earned" triggering event occurs when a player earns a certain number of points on the gaming device, such as: bonus points, Xtra credit points, or even machine credits. An award can be generated when such a minimum point level is met.

A "Win/Loss Per Unit of Time" triggering event occurs when a player obtains a certain number of wins or loses on a gaming device over a predetermined time period. Examples include a player losing 100 times over a 20 minute time period, or where a player wins 7 times over a one-minute period.

A "Visitation Frequency" triggering event occurs to reward players for frequent visits to the casino(s). Examples include triggering the award upon the third consecutive day the player visits a particular casino, the fifth visit to any casino within a group of casinos within a year, or after a player has played for a total of twenty-four hours of non-continuous play. Flags maintained within the player database 142 within the gaming network 5 allow a casino to track this type of visitation and play criteria over a long period of time.

A "Handle Per Unit of Time" triggering event occurs for players betting a certain amount over a certain time period. Examples include a player betting at least a total of $500 at a slot machine over a one-hour period, or where a player bets his/her $1000^{th}$ coin at a nickel poker machine.

A "Continuous Play" triggering event occurs after the player has continuously played on a machine for a preset time period. For instance, the award might be triggered every ten minutes of play, or a super promotion after two hours of continuous play.

A "Specific Player Demographics" triggering event occurs only for those players fitting the specific profile designated. For instance, the casino might run a promotion where players from Chicago or from out of state receive the promotion the first time during any one day that they play particular machines. The demographic information is stored in the player database 142 on the gaming network 5, and the player ID is established when the player inserts his/her player tracking card and/or typing in a PIN. Additionally, player demographics stored in the promotion server 160 or elsewhere on the gaming network 5 can include player grouping or ranking used to signify the betting patterns of different players. For instance, "high rollers" would have higher rankings than lower betting players.

A "Sets of Player Demographics" triggering event occurs for those players fitting more than one (and perhaps all of the) designated profiles that are stored in the promotion server 160 or elsewhere on the gaming network 5. For instance, the casino might run a promotion for seniors aged 65 and older who come from out of state. Again, the individual demographic information is stored in the player database 142 coupled to the player server 140 on the gaming network 5.

A "Lucky Coin" triggering event occurs for a player inserting the xth coin-in on a certain pre-designated portion of the games coupled to the gaming network 5. An award can be generated when the coin is inserted or credit otherwise transferred.

A "Lucky Time" triggering event occurs for a random player playing at a designated time of day.

A "Lucky Game" triggering event occurs for a random player who is playing on one of the gaming devices coupled to the gaming network 5.

An "Electronic Drawing" triggering event occurs where a player is awarded a drawing ticket. Detailed discussion of this trigger event appears below.

These are only a small sample of potential triggering events that can be contemplated and the invention should not be so limited to those disclosed and described. Embodiments of the invention could conceivably use any data accessible anywhere in the gaming network 5 to create a trigger. The triggers could be as simple as to award system awards to everyone who is playing at 3:00 pm Friday to as complex as imaginable. A trigger may have a single component, such as that described above, or could have dozens of components (e.g.: a free spin to players who have a current coin-in level that is 15% higher than their coin-in average for the last month if the player is playing at a game introduced in the last 4 months and is staying in the casino hotel). The number of different triggers possible in the gaming network 5 is nearly infinite. Implementation overhead, however, may limit the casino to minimizing the number of components of a trigger, or the amount of calculation that has to be performed to check whether certain trigger conditions have been met.

Trigger conditions can also include events occurring outside of the gaming floor. In one embodiment, the trigger condition can be a purchase at a retail location associated with the gaming casino. The trigger condition could include a certain purchase amount, a specific location, the identity of the person making the purchase, etc. A ticket printer would be located at the retail location and respond to instructions issued by a linked promotional server.

Triggering events need not be applied uniformly to all of the gaming devices coupled to the gaming network 5, or to all of the players playing the gaming devices. There may be different triggering events or sets of triggering events for different groups of gaming devices. For example, with reference to FIG. 4, a first set of triggering events could apply to the EGMs 10 that are in bank 82, but not to those EGMs in banks 84 and 86. That is, there could be a triggering event implemented, such as generating a drawing ticket after "x" minutes of play, where "x" is 40 minutes for EGMs in bank 82, 50 minutes for EGMs in bank 84 and 60 minutes for EGMs in bank 86. Of course, although illustrated here as groups of EGMs associated with a particular bank, any of the EGMs 10 within the entire network 5 could have one or more triggering events that are different from any other EGM.

The same level of control extends to player groupings as well. For instance, certain triggering events could be set up for those players who have signed up for player tracking in the past 6 months, while another set of triggers applies to other players. Individual tailoring of a gaming network based on player identity is disclosed in copending application entitled "Player Specific Game System", filed Sep. 18, 2002 and having Ser. No. 10/247,786, which is assigned to the assignee of the present invention and incorporated herein by reference for all purposes. One way to tailor the gaming network is to have different triggers for groups of players, or for individual players themselves.

Using the Ticket Printer System in Game Promotion

Once a ticket printing system such as the one described above is established, several types of promotions to promote game play can operate on such a system. The promotions can include generating system award tickets for the player, as described below.

One such promotion is a drawing ticket promotion. In this promotion, a player identifies himself or herself to the player server 140 on the gaming network 5. Once identified, bonus points are accumulated based on amount of play, such as "coin-through", as is known in the art, and tracked in the player account stored on the player database 142. Once the bonus points have accumulated to 100, or some other set number, the promotion server 160 causes a "drawing ticket" to be printed for the player. The drawing ticket is a system award. In some embodiments, the promotion server 160 will generate a "drawing" ticket for each 100 bonus points that the player accumulates. Each drawing ticket has a unique number printed on the ticket, and data of the drawing ticket is stored in the player database 142. At a pre-determined time, a drawing is held for a prize, such as money, credits, or another type of prize. One of the numbers that was printed on the drawing tickets that were generated during a given time period is selected as the winning ticket. The drawing rules may require that the player be present to win. Doing so could encourage players to return at a specific time, which could in turn promote additional play on the gaming machines. Or, because the numbers on the drawing tickets can be automatically associated with a player and stored in the player's account, the player would not necessarily need to be present to win.

In operation, this promotion could use data from each of the databases illustrated in FIG. 4. For instance, player data such as past playing history from the player database 142 can be considered. Bonus data from the bonus database 152 may also be used. Data regarding when and where to generate the system award and formatting data used to print the ticket can be retrieved from the databases 162, 164. Additionally, modeling parameter data, such as the requisite number of bonus points accumulated prior to generating the drawing ticket, can be retrieved from the parameter database 164. The promotion server 160 can utilize data from each of those inputs and others on the gaming network 5 to determine when to generate the ticket.

Also, referring to FIG. 7, the ticket printing promotion can implement the looping processes 350 and 360 while it is continuously monitoring the important parameters. Once all of the parameters are present to cause a ticket to be generated, the flow 300 passes to the process 370, where the ticket is generated. Once the ticket is generated, the flow 300 returns to the process 350 to again monitor the data inputs.

Another type of promotion could be used to encourage an unidentified player to become an identified player. Sometimes, for privacy or other reasons, players do not want to be identified. Or, perhaps a player didn't have a player identification card with them when they went to play at a particular casino.

The promotion involves identifying a player who is accumulating bonus points but, because the player is unidentified, the bonus points are not credited to a certain player account. The unidentified player is invited to identify himself or herself and have the bonus points added to either a new or their existing player account. Possibly the player may be convinced to identify himself or herself, which can benefit the casino, if the potential player award is high enough. In this promotion, the promotion server 160 monitors the gameplay of a non-identified player. If the player exceeds a threshold that indicates they are doing well, for example if they accumulate over 25 bonus points, the promotion server 160 causes a prize ticket for a system award to be awarded. The player can take their prize ticket to a customer service desk in the casino to claim their prize. However, the player must sign up for a player account to be eligible to receive the prize. If the player was in fact a player who already had an account but did not identify themselves to the gaming network, then the bonus points that the player accumulated could be credited to the proper account at the customer service desk.

In this instance the ticket could print with a particular numerical code that identified how many bonus points that were accumulated. Then, the casino employee can access the gaming network to properly credit the accumulated bonus points, based on the numerical code assigned.

A further method of using the ticket printer 76 is where a bank or banks of machines 10 can be linked together with an associated bonus meter such as displayed on general signage 94. The bonus meter increases in value based on a number of factors set at the configuration workstation 130 and stored within the bonus database 152 such as coin-in, games played, or an independent promotional pool. As the players on machines 10 continue to play, pre-determined events set by the operator trigger a random number generator that determines the outcome of the bonus event. If the player's bonus event is a winner, then the progressive meter is awarded as a promotional ticket printed directly at the game being played by the winner. Since the actual bonus need not be directly tied to a player, any game located on the ticketing system network can win the bonus. Awarded tickets can then be either reinserted back into the gaming machine being played, or taken to any other gaming machine on the network. The bonus tickets can further be made to be cashable or playable only.

In one promotion, the ticket printer 76 is used to provide a mystery ticket. In this promotion, the player would be rewarded on a future visit for gaming activity wagered in the current gaming session, or within a virtual session. Triggering of such a ticket occurs as described above, and also when the player cashes out or the credit meter reaches zero, the promotion is triggered. The system can be adapted to calculate a percentage of the coin-in, coin-out, theoretical win or actual win generated during the current session. The normal cash-out ticket is printed followed by a promotional ticket. The promotional ticket is valid for a certain amount of credits when the ticket is inserted back into a game at the proper time. A waiting period may be required before the promotional ticket can be redeemed so that; for instance, the player is encouraged to play at the casino during the next day. In operation, the player inserts the claim ticket into the bill validator of the game; the system recognizes the ticket as a claim ticket and stores the reference for future use. Once the player cashes out from this subsequent session via the established process, a new ticket is generated with a new validation number. The new validation number references the validation number from the virtual session to create a “string” of such tickets.

In another promotion, a string of related tickets could be claimed by a player who received them without the player having been tracked by the player tracking system. This virtual tracking system would create a virtual record of the player using the string of numbers identified on the tickets reflecting prior gaming sessions. The virtual sessions could then be imported into a player database when the player finally decides to set up an account at the casino. Imported virtual session would populate a new player account with data that would otherwise be lost. Alternately, the anonymized player ticket could later be taken by a rated player as associated with his or her previously established player account. In this way, a player need not be identified for each play session and yet still retain the benefits (e.g. accumulated player points) from continued play.

Another promotion encourages the player to stay in a hotel associated with the particular casino in which the player is playing. One of the items that can be stored in the player database 142 is whether the player is staying in the hotel associated with the casino where the gaming network 5 is installed. A promotion to encourage the player to stay in the casino hotel operates by using this information in conjunction with other parameters stored in the modeling parameters database 164 or player database 142. For instance, the promotion server 160 can monitor the gameplay of the player who is not staying in the hotel. Once the player has played for a certain period of time, for example over 3 hours, the promotion server 160 can grant a system award offering a complementary or discounted room in the casino. If the player is staying at the particular casino’s hotel, they may be more likely to play the games for a longer period of time.

Another promotion utilizes the ticket printer 76 in conjunction with the keyboard 42 and display 46 or touchscreen 52 mounted on the gaming device 10. In such a promotion system, the promotion server 160 determines that some sort of system award should be given to the player, but allows the player to choose which system award they would like. In implementation, when an event causes the promotion server 160 to send a system award to the player, instead of instructing the bonus engine 50 to cause a ticket to be printed, a selection mechanism is provided to the player. For instance, the bonus engine 50 may cause a display to be shown on the touchscreen 52 that includes several different prizes. For example, a player could be given the choice of a complimentary meal or bonus credits. Or the player could be given the choice of a meal, bonus credits, and one or more drawing tickets (described above). The player could then make his or her selection from the items displayed, and the bonus engine 50 would cause the appropriate system award ticket or receipt to print at the printer 76. For instance, if the complementary meal were selected, a meal voucher would be printed for the player that can be redeemed in the casino restaurant.

Another promotion using the ticket printer 76 can encourage a player to return. For instance, when the player cashes out or decides to leave, a ticket inviting the player back is printed at the printer 76. The ticket could indicate that if the customer returns within a certain time, for instance 24 hours, the player will qualify for a system award of free play or bonus credits. Of course, the time period in which to return and the amount of system award given upon return can be adjusted by the casino operator.

Another promotion utilizes both the display screen 46 or 52 and the ticket printer 76, but need not actually be related to the gaming device 10. For instance, a player may identify himself or herself to the gaming network 5 by inserting a casino card and/or entering a PIN number. Then, the bonus engine 50 or other portion of the gaming network 5 generates a menu where the player can view the status of the player’s account. For instance, the player could check to see how many bonus points they have accumulated. Then, by making appropriate selections on the display screen 46 or 52, the player can manage their bonus account. For example, the player could choose to convert some of their bonus points into a complementary meal. In such a case, bonus points are deducted from the player’s account, and a complimentary meal ticket for the system award is printed at the ticket printer 76.

A further method of using the ticket printer 76 is to print instructions or a receipt for use by the player. For example, if the player is potentially confused about the rules of a particular game, or would like clarification on the way a bonus works, a selection can be presented on the display 46, 52. When the player makes a selection, the bonus engine 50 causes the ticket printer 76 to print out the rules or instructions on a ticket or series of tickets for the player to have and take with him or her.

By generating tickets for awards at appropriate times, a casino can promote loyalty from its patrons. For instance, by specially rewarding customers who play many hours at the games, customers are likely to play longer than if they were not rewarded.

Although examples of machines and processes have been described herein, nothing prevents embodiments of this invention from working with other types of machines and processes. Implementation of the promotion system is straightforward in light of the above description. As always, implementation details are left to the system designer. The specific circuits and procedures used to decide when tickets should be produced, and the way the actual tickets are produced may be implemented in any way, with any components, so long as they can generate the desired effect. Inclusion of description or illustration of a function in either the gaming device or the gaming network is not dispositive that the function is located in or must be performed there. The award generating system works even when not all of the illustrated functions are present Issuing Gaming Device Tickets in Response to Retail Purchases As noted above, some slot machines incorporate ticket readers that can apply playable credit to a slot machine when a ticket is inserted into the reader. In the present promotion, ticket printers 76 are distributed in various retail locations 77 at the casino, such as the spa, restaurants, retail clothing stores, etc. When a purchaser is identified, either as a result of a single purchase or as a result of multiple purchases tracked by the casino, a promotional ticket at the retail outlet 77 can be printed and given to the customer. Such an identified customer can be one that meets certain spending levels established by the casino. Known customer relationship management systems are known that can track retail activity of each customer. The promotional ticket can be inserted for play at one of the gaming machines and thus entices the customer onto the floor to play a slot machine. In one aspect, the coupon is useable only if the player either has or obtains a player tracking card, which establishes player identification information and an account with the casino. Thus, casual players or retail customers only are converted to carded players, which enable the casino to better market its services.

In another aspect, the ticket can be immediately redeemed at the slot machine ticket reader for a face value thereon. But if the player plays and accumulates a pre-selected level of play, which can be tracked using the player-tracking system, the value of the ticket increases. In another aspect, the value increases proportional to the amount played. As a result, if the player first plays with his or her own money, the value of the ticket, when redeemed, is increased above its face value. Persons having ordinary skill in the art can implement computer code that assigns a particular value (selected by the casino) to the ticket based on increased play tracked by the player's account.

In still another aspect, this promotion comprises an award for play at table games, bingo, keno, and race or sports books. The promotional ticket could also be given to a customer who cashes his or her paycheck or awarded upon check-in at the casino hotel.

In one embodiment, eligible customers swipe their player card in a card reader at the retail point of sale, and a random number generator awards a random amount of non-redeemable credits. Alternatively, fixed amounts can be awarded or awards from tiers are based on the player's rating with more valuable players being given bigger awards. Or a single pool of prizes can be randomly distributed with all customers being equally eligible to win from the pool.

Graphic and audio sequences, using a plasma screen, for example, and an audio system, like those on the gaming floor, can be provided where the ticket is issued to the customer.

Incentives for Night Cub Patrons to Play Electronic Gaming Devices

This promotion can be implemented, as least in part, using a system for awarding a bonus during a pre-determined time, which is disclosed in U.S. patent application Ser. No. 10/189,041, filed Jul. 2, 2002, which is incorporated herein by reference for all purposes. Certain areas of the casino, those close to the nightclub in the present implementation, feature this bonus. In other words, only machines near the club are eligible to be awarded the bonus. In one version, if the bonus is awarded to the machine played by a player, the player wins a line pass for two and a round of drinks at the nearby nightclub. The line pass entitles the player to enter the club without waiting in line. Some casinos have very popular nightclubs that have long waiting lines.

In another version, the player collects multiple bonus awards with each award increasing in value. For example, the first award could be a line pass for one; the second, a line pass for two plus drinks; the third, a line pass for four plus drinks; and the fourth, all of the above plus $1,000 in non-redeemable credit. This promotion therefore attracts people to play games who are initially motivated to attend the nightclub. It should be noted that in the present embodiment of the invention, a player-tracking card must be inserted in the machine for the player to be eligible to receive the bonus.

The bonus could be delivered in different ways. For example, a ticket printer on the machine could print a coupon that could be presented at the nightclub for admittance and for the complimentary drinks. Alternatively, the pass and a related coupon for the complimentary drinks could be hand-delivered to the slot machine player by an attendant. In still a different embodiment, the award could be made to the player's account. The player tracking card could then be swiped in a card reader at the entrance to the nightclub to provide admittance, a coupon for admittance, and/or a coupon for complimentary drinks. Such coupons could also be printed at another station at the casino, for example, the player tracking booth.

Examples of Printed Tickets

Figure 9:
Figure 10:

FIGS. 8-10 show examples of tickets representing awards that can be printed at the gaming device 10, at a backroom printer, a kiosk, or at a retail station, using embodiments of the invention. As described above, when the award is granted by the gaming network, codes are generated by the ticket event generator 72 on the bonus engine 50 (or elsewhere on the gaming network 5) to cause the game printer 30 (FIG. 5) or the system printer 76 (FIG. 6) to generate the tickets. A record of the generated ticket is stored in the player database 142 and/or elsewhere on the gaming network 5. For instance, the record of the generated ticket may also be stored in the bonus database 152, promotion database 162, and/or on the modeling parameters database 164 (FIG. 4).

Some of the tickets, for instance those illustrated in FIGS. 8 and 9, include a barcode printed directly on the ticket as machine-readable indicia reflecting the ticket identification code. The barcode may identify the particular singular ticket, or the type of ticket generated. If applicable, the player may redeem the printed ticket by inserting the ticket into the bill acceptor 20 of the gaming device 10 (FIG. 1). The bill acceptor can check the data record stored on the player database 142 for the particular identified player to determine if the player is eligible to receive such an award. If eligible, the player's record is updated to reflect that the award has been redeemed. This prevents unauthorized use of awards, such as by transferring awards to players not eligible to receive them or copying another's award.

The ticket also includes human-readable printed indicia indicative of a possible value of the ticket. The printed indicia in a mystery ticket such as shown in FIGS. 8-10 would not reflect a specific and definite value for the ticket. Instead, in a preferred embodiment of the invention and as shown in the figures, the printed indicia would reflect a range of possible values for the ticket. The specific value is associated with the ticket at the bonus server or within the player record at the time of issuance, or is determined later depending upon the award scheme criteria defined at the time of issuance. For instance, the redeemed ticket may result in a first award if redeemed within the next month; a second, higher award if redeemed within a week; and a third, highest award if redeemed between two and four days from ticket issuance.

With mystery tickets, players would not know the value of their ticket until they insert it back into any machine to redeem it. A mystery ticket, like that shown in FIG. 8, is delivered to a prospective slot machine player. Such a player could be on or adjacent the casino premises or the coupon could be delivered to the player via U.S. mail, the Internet, or some other mechanism. The ticket is good for credit on a slot machine when inserted into the ticket reader on a slot machine. Such tickets and readers are known in the art. The present ticket, however, does not indicate a value printed thereon as prior art tickets do. In the present embodiment, the player is notified that the ticket has a value that falls within a stated range, in the present embodiment of the invention between $25 and $100. As a result, a player is enticed into the casino to determine the amount of the mystery award. In one embodiment of the invention, the credits are of the type that can be played but not cashed out, like those disclosed in U.S. Pat. Nos. 6,431,983 and 6,371,852, both of which are incorporated herein by reference for all purposes. A ticket system for printing and reading such tickets is disclosed in co-pending provisional application Ser. No. 60/553,476, filed Mar. 15, 2004, which is incorporated herein by reference for all purposes. Although the co-pending provisional application discloses bonus tickets that are printed by printers located at the slot machine, it can be appreciated that a similar ticket without a value printed thereon—as is the case with the mystery ticket promotion—can be printed by casino management on a printer not associated with the slot machine. These tickets are then distributed as described above.

In a variation, the player must apply for and be issued a player-tracking card before the mystery coupon can be used. This increases the casino's database of tracked players and thereby enhances marketing possibilities.

The invention also comprises methods for redeeming printed indicia for specific value at gaming devices interconnected by a gaming network to a host computer, as shown in FIG. 4. Trigger conditions are set at a configuration workstation 130 and stored on the network as within promotion server 160. A condition triggering ticket printout is detected and a print command via a selection signal is transmitted over the network to a specified printer responsive to the detected trigger condition. If the player is identified on the player network by player card, and the trigger condition is achieved, then the print command could be sent to the gaming machine 10 on which the player is currently playing. If the player is not currently at the casino when the trigger condition is fulfilled, the ticket could be printed on a remote, back room printer and delivered to the player via other means. Printed output is generated at the designated printer responsive to receipt of the selection signal and designated machine-readable indicia and human-readable indicia. The signal transmitted to the printer may include the ticket ID number bar code and a value range to be printed on the ticket. In the situation where the ticket value is specified upon generation, the specific value is associated at the host or promotions computer with the ticket ID number so that redemption of the ticket would result in the specified award. Where the award is instead and unspecified amount but one which is later generated upon redemption, the award scheme for calculated the specified amount of the ticket is stored in association with the ticket ID number. The award scheme could specify, for instance, that the specific award redeemable for the ticket depends upon the player Tier number and a random number selection. When the player finally redeems the ticket by feeding it to a ticket reader, the machine-readable indicia read at the ticket reader is transmitted over the network to the promotions server and the specific award associated with the ticket is awarded to the player.

Having described and illustrated the principles of the invention in a preferred embodiment thereof, it should be apparent that the invention can be modified in arrangement and detail without departing from such principles. We claim all modifications and variation coming within the spirit and scope of the following claims.

The invention claimed is:

1. An award ticket for use in an award system having a bonus server associating a ticket with a ticket value and a ticket reader adapted to receive said award ticket, said award ticket including:

a machine-readable identification code where said code is associated with an award scheme specifying that an award redeemed for the award ticket depends on a random number selection and a location of a printer from which the ticket was printed, said ticket value being undetermined at issuance of said award ticket and determined at the redemption of said award ticket based on application of said award scheme to said machine-readable identification code, wherein said ticket value is assigned to said code at said bonus server at the redemption of said award ticket, and a human-readable printed indicia indicating a range of possible ticket values.

2. The award ticket of claim 1, wherein the machine-readable identification code is a bar code.

3. The award ticket of claim 1, wherein the machine readable identification code is included on a magnetic stripe.

4. A method for redeeming printed indicia for specific value at gaming devices that are interconnected by a gaming network to a host computer, the method comprising:

storing a trigger condition at the host computer;

detecting said trigger condition;

sending out a selection signal over the network to a printer location responsive to the detected trigger condition;

generating a printed output at said printer location responsive to receipt of said selection signal, the printed output including machine-readable indicia and human-readable indicia, said machine-readable indicia corresponding to a ticket identification code and said human-readable indicia corresponding to a range of possible values of said ticket with no specific value indicated, said machine-readable indicia being associated with an award scheme specifying that an award redeemed for the printed output depends on a random number selection and said printer location, a specific value of said printed output being undetermined at issuance of said printed output;

accepting the printed output at a gaming machine and awarding a specific value bonus associated with said output, said specific value bonus determined and assigned to said machine-readable indicia after acceptance of said printed output at said gamin machine; and tracking a level of play at the gaming machine after acceptance of the printed output at the gaming machine.

5. The method of claim 4, wherein generating printed output comprises generating a ticket at a gaming device on the network.

6. The method of claim 4, wherein generating printed output comprises generating a ticket at a ticket printer located in a retail location associated with casino, said trigger condition being a purchase at that retail location.

7. The method of claim 4, where awarding a bonus comprises applying credits to a player account at the selected gaming machine.

8. The method of claim 4, where awarding a bonus comprises applying credits to a playable-only credits meter at the selected gaming machine.

9. The method of claim 4, where awarding a bonus comprises applying credits to a player account only if the printed output was accepted at the gaming machine within a redeemable time period.

10. The method of claim 9, wherein the redeemable time period includes a preestablished start time that occurs after a time at which the printed matter was generated at the selected gaming machine.

11. A method for redeeming printed indicia for specific value at gaming devices that are interconnected by a gaming network to a host computer, the method comprising:

storing a trigger condition at a host computer;

detecting said trigger condition at a retail location and sending out a selection signal over the network to a printer location responsive to the detected trigger condition;

generating printed output at said printer location responsive to receipt of said selection signal, the printed output including machine-readable indicia corresponding to a ticket identification code, said ticket identification code being associated with an award scheme specifying that an award redeemed for the printed output depends on a random number selection and said printer location, a specific value of said printed output being undetermined at issuance of said printed output;

accepting the printed output at a gaming machine;

determining said specific value and assigning said specific value to said ticket identification code after acceptance of said printed output at said gaming machine;

awarding said specific value bonus associated with said ticket identification code; and tracking a level of play at the gaming machine after acceptance of the printed output at the gaming machine.

12. The method of claim 11, the step of awarding said specific value bonus with the ticket identification code comprising associating a random amount of non-redeemable credits with the ticket identification code.

13. The method of claim 11, the step of awarding said specific value bonus with the ticket identification code comprising associating a fixed amount depending upon a player rating associated with the ticket identification code.

14. The method of claim 13, the fixed amount being higher for players having a higher player rating than those players having a lower player rating.

15. The method of claim 11, the step of awarding said specific value bonus with the ticket identification code comprising determining a plurality of prizes within a pool of such prizes, and associating a random one of such prizes with the ticket identification code.

16. The method of claim 11, further including:

increasing the specific value bonus of the ticket in relation to the level of play tracked.

17. The method of claim 16, wherein the specific value bonus is increased proportional to the level of play.

18. The method of claim 11, wherein the trigger condition is a purchase made at the retail location.

19. The method of claim 18, wherein the retail location is selected from the group consisting of spa, restaurant, retail clothing store, and jewelry store.

20. The method of claim 18, further including tracking multiple purchases by a player and initiating the trigger condition when the tracked amount purchased exceeds a certain amount.

* * * * *